US012793888B2

(12) United States Patent
Negri et al.

(10) Patent No.: US 12,793,888 B2
(45) Date of Patent: Nov. 10, 2026

(54) INSTRUMENT TRANSFORMER AND METHOD TO ISOLATE PARTS

(71) Applicant: HSP HOCHSPANNUNGSGERÄTE GMBH, Troisdorf (DE)

(72) Inventors: Fabrizio Negri, Nuremberg (DE); Dario Santinelli, Pontinvrea (IT)

(73) Assignee: Hochspannungsgeräte GmbH, Troisdorf (DE)

( * ) Notice: Subject to any disclaimer, the term of this patent is extended or adjusted under 35 U.S.C. 154(b) by 1060 days.

(21) Appl. No.: 17/626,582

(22) PCT Filed: Jun. 17, 2020

(86) PCT No.: PCT/EP2020/066667
§ 371 (c)(1),
(2) Date: Jan. 12, 2022

(87) PCT Pub. No.: WO2021/008799
PCT Pub. Date: Jan. 21, 2021

(65) Prior Publication Data
US 2022/0319770 A1 Oct. 6, 2022

(30) Foreign Application Priority Data
Jul. 12, 2019 (EP) .................................... 19186063

(51) Int. Cl.
*H01F 38/36* (2006.01)
*H01F 27/02* (2006.01)
(Continued)

(52) U.S. Cl.
CPC ............. *H01F 38/36* (2013.01); *H01F 27/02* (2013.01); *H01F 27/321* (2013.01); *H01F 41/12* (2013.01)

(58) Field of Classification Search
CPC ........ H01F 38/36; H01F 27/02; H01F 27/321; H01F 41/12; H01F 27/324; H01F 27/327;
(Continued)

(56) References Cited

U.S. PATENT DOCUMENTS 2,703,390 A * 3/1955 Marks ..................... H01F 38/30 336/173
4,095,205 A * 6/1978 Schroeder ............. H01F 27/324 336/206
(Continued)

FOREIGN PATENT DOCUMENTS

CN 102057454 A * 5/2011 ............. H01F 38/20
CN 105144320 A 12/2015
(Continued)

*Primary Examiner* — Tuyen T Nguyen
(74) *Attorney, Agent, or Firm* — Laurence A. Greenberg; Werner H. Stemer; Ralph E. Locher

(57) ABSTRACT

An instrument transformer for high current and/or high voltage conversion has a housing and at least an active part, which is electrically insulated by an isolation material. The isolation material includes particles. A method for the instrument transformer includes the filling of a housing of the instrument transformer with particles, particularly with particles of paper material and/or cellulose, which were impregnated by an insulating fluid, particularly mineral oil and/or a synthetic oil, and/or ester, particularly vegetable esters.

14 Claims, 2 Drawing Sheets

(51) Int. Cl.
*H01F 27/32* (2006.01)
*H01F 41/12* (2006.01)

(58) Field of Classification Search
CPC ...... H01F 38/30; H01F 41/125; H01F 41/127; H01F 38/26; H01F 38/20; H01F 41/005
USPC ......................................... 336/55–62, 90, 96
See application file for complete search history.

(56) References Cited

U.S. PATENT DOCUMENTS

| | | | |
|---|---|---|---|
| 5,391,835 A | 2/1995 | Yao et al. | |
| 6,980,076 B1 | 12/2005 | Rolling et al. | |
| 10,351,996 B2 * | 7/2019 | Pitois | D21J 1/20 |
| 2005/0072964 A1 | 4/2005 | Rapp et al. | |
| 2008/0179077 A1 | 7/2008 | Krivda et al. | |
| 2016/0351291 A1 | 12/2016 | Turpin et al. | |

FOREIGN PATENT DOCUMENTS

| | | | | |
|---|---|---|---|---|
| CN | 105229760 A | 1/2016 | | |
| CN | 105934800 A | 9/2016 | | |
| DE | 10110062 A1 * | 9/2002 | H01B 19/00 |
| EP | 1297540 A1 | 4/2003 | | |
| EP | 2800113 A1 | 11/2014 | | |
| EP | 3544032 A1 | 9/2019 | | |
| WO | WO 2006118536 A1 | 11/2006 | | |
| WO | WO 2009146569 A1 | 12/2009 | | |

* cited by examiner

INSTRUMENT TRANSFORMER AND METHOD TO ISOLATE PARTS

FIELD AND BACKGROUND OF THE INVENTION

The present invention relates to an instrument transformer and a method, for high current and/or high voltage conversion, comprising a housing and at least an active part, which is electrically insulated by an isolation material.

Oil insulated instrument respectively measurement transformers are for example known from U.S. Pat. No. 5,391,835 A. The instrument transformers are used to measure high currents and/or voltages, particularly in the range up to some hundred Ampere and/or up to 1200 kV. An instrument transformer comprises a housing and at least an active part, which includes a measuring assembly. The measuring assembly comprises for example windings arranged around an electric conductor, which can be used to measure a current in the conductor by magnetic induction in the windings. The active part is electrically insulated by an isolation material from the housing of the instrument transformer. The whole measuring assembly or parts of the measuring assembly are wrapped by kraft paper sheets and the housing is filled by oil, to electrically insulate active parts.

An insulation of the measuring assembly by kraft paper, particularly paper tape respectively paper sheets, is carried out by manually taping the measuring assembly. A manual taping procedure takes much time, is expensive due to manpower costs and suffers from human errors. Due to complex shapes of parts of the measuring assembly, an automation of taping procedures is difficult and expensive.

SUMMARY OF THE INVENTION

An object of the present invention is to overcome the problems described above. Especially an object of the present invention is to describe a method to insulate parts of an instrument transformer and an instrument transformer with electrically insulated parts, with an easy to produce and cost-effective insulation.

The above objects are achieved by an instrument transformer for high current and/or high voltage conversion as claimed and/or by a method for an instrument transformer, particularly for an instrument transformer described above, as claimed.

An instrument transformer for high current and/or high voltage conversion according to the present invention comprises a housing and at least an active part, which is electrically insulated by an isolation material. The isolation material comprises particles.

Particles are easy to handle, especially easy to fill in a housing for example by a machine. The use of isolation material comprising particles enables an automation of production, saves costs and is easy to perform, with no or little fault probability. There is no manual taping procedure needed to isolate the measuring assembly, where taping cannot be fully automated, is costly, time consuming and not easy to perform. The human contribution during a manufacturing process can be reduced, introducing automated respectively fully automated filling processes, leading to cost, time and fault reductions.

Particles can be in powder form. Powder is easy to produce and handle, and can be filled into a housing fast, cost-effective and with low effort, for example fully automated.

Particles can be impregnated by an insulating fluid. The insulating fluid can be or can comprise oil, particularly mineral oil and/or a synthetic oil, and/or ester, particularly vegetable esters. These materials are good isolation materials, especially at high voltages up to 1200 kV. Time for impregnation of isolation material can be reduced, using particles filled into the housing of the instrument transformer and impregnation of particles by insulation fluid, before and/or after filling.

Particles can be composed of or comprise paper material and/or cellulose. Paper material and/or cellulose are good isolation materials, especially at high voltages up to 1200 kV, are environment friendly, cost-effective and easy to handle as particles. Particles of paper material and/or cellulose can be easy handled fully automated and are easy to produce in specific sizes.

Particle size can be in the range of micro- and/or nanometer. This size gives a high fill factor, with little amount of space between particles, can easy be produced of paper material and/or cellulose, can be easy impregnated by a fluid, and/or is easy to fill into a housing, particularly fully automated.

The surface to volume ratio of particles can be higher, particularly at least two times, particularly at least ten times higher than for the same material in form of sheets. A high surface to volume ratio of particles enables a high electrical isolation effect, a good dissolution in fluids and/or impregnation in for example fluids.

Particles can be in spherical form, and/or particles are in fibrous form. Both forms enable a high surface to volume ratio with advantages as described before.

The fill factor of particles in the isolation material can be high, particularly maximized, for example by filling and pressing particles particularly in powder form into the housing and/or ramming the particles in the housing to get a high fill factor. A high fill factor of particles enables a high electrical strength, i.e. a high electrical isolation effect. Particles act in difference to the state of the art not as contaminants, reducing electrical withstand capabilities, but particles particularly with high fill factor increase electrical withstand capabilities, particularly isolation between parts of the instrument transformer.

The isolation material with particles can be arranged in the housing, particularly the head housing and/or isolator and/or base. It can be arranged between the housing and active parts, particularly the measuring assembly and the housing. This arrangement enables a good electrical isolation between measuring assembly and housing.

The isolation material with particles can fill in, particularly completely fill in space between the housing, particularly the head housing and/or isolator and/or base, and active parts, particularly the measuring assembly. A good electrical isolation of parts of the instrument transformer between each other can be reached by filling in, particularly completely filling in space between the parts.

A method for an instrument transformer, particularly for an instrument transformer as described before, comprises the filling of a housing of the instrument transformer with particles, particularly with particles of paper material and/or cellulose, which were impregnated by an insulating fluid, particularly mineral oil and/or a synthetic oil, and/or ester, particularly vegetable esters.

Particles can get impregnated in the instrument transformer housing after filling in the particles into the housing.

Impregnated particles in the housing of the instrument transformer can electrically insulate active parts of the instrument transformer, particularly the measuring assembly, from the housing of the instrument transformer.

The advantages in connection with the described method for an instrument transformer according to the present invention are similar to the previously, in connection with the instrument transformer for high current and/or high voltage conversion described advantages.

BRIEF DESCRIPTION OF THE FIGURES

The present invention is further described hereinafter with reference to illustrated embodiments shown in the accompanying drawings, in which.

DETAILED DESCRIPTION OF THE INVENTION

Figure 1:
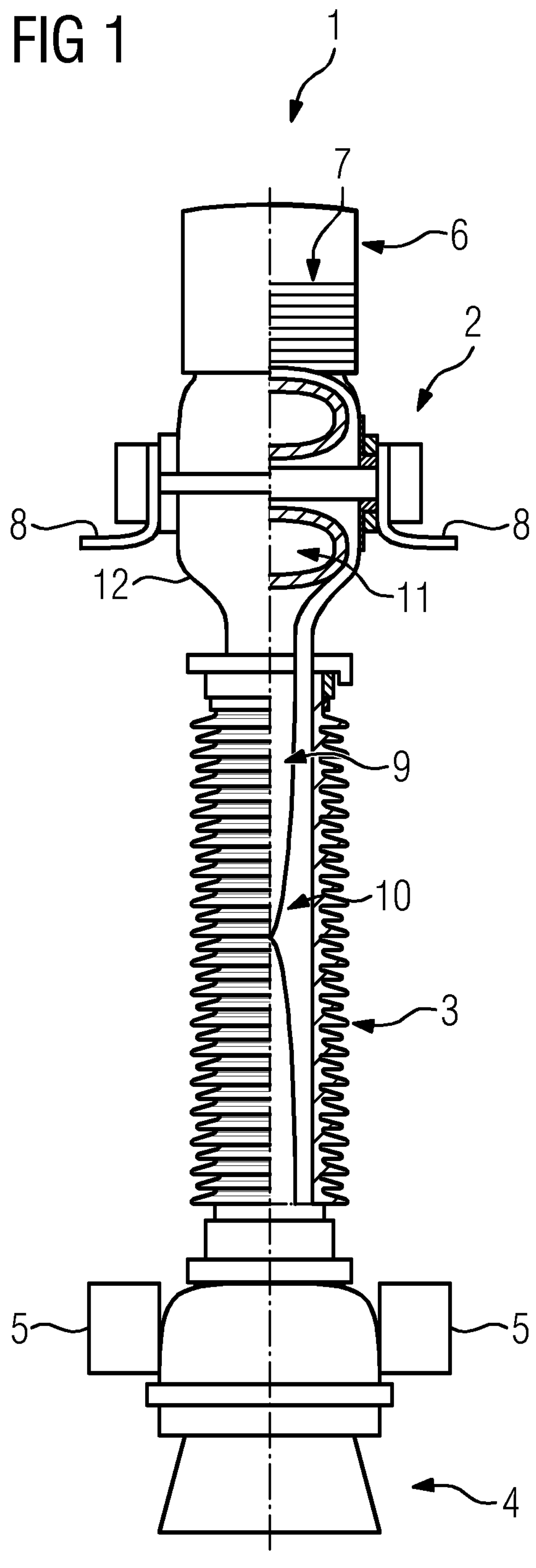
FIG. 1 illustrates an instrument transformer 1 for high current and/or high voltage conversion in section view, comprising a housing and at least an active part, which is electrically insulated by an isolation material 9.

In FIG. 1 is in section view an instrument transformer 1 for high current and/or high voltage conversion shown. The instrument transformer 1 comprises a housing and at least an active part, which is electrically insulated by an isolation material 9. In the embodiment of FIG. 1 an active part of the instrument transformer 1 includes a measuring assembly 11 with for example windings arranged around an electric conductor. The windings can be used to measure a current in the conductor by magnetic induction in the windings. Further active parts are for example control electrodes and/or a discharge pipe.

The active part, particularly the measuring assembly 11, is located within the housing of the instrument transformer 1. The instrument transformer 1 for example comprises a head 2, an isolator 3 and a base 4, which are particularly assembled by a head housing 12 with bellow cover 6, including an oil level indicator 7, by an isolator 3 particularly composed of a hollow cylindrical body and by a base 4 for example in form of a cast-iron pedestal. The isolator 3 is for example a ceramic, silicon and/or composite hollow body with plate fins at the outer sheath to increase leakage current length.

The isolator 3 is for example columnar with two ends of the column, arranged with the base 4 on one end and the head 2 on the other end. The head 2 is on top of the upstanding columnar isolator 3, comprising high voltage terminals 8 to electrically connect the instrument transformer 1 with high voltage lines, electrical generators and/or electrical consumers, to measure current/voltage of electrical high voltage lines and/or devices. A measuring assembly 11 as active part within the housing of the instrument transformer 1 measures current and/or voltage in between the high voltage terminals 8. Transferred via active parts as for example a discharge pipe and/or VT primary, secondary windings and VT core, measuring results can be recorded and/or read from meters within terminal boxes 5 particularly arranged at the base 4.

The active part is electrically insulated by an isolation material from the housing of the instrument transformer. In the state of the art kraft paper sheets are used as isolation material. The whole active part or parts of the active part are wrapped by kraft paper and the housing is filled by oil, to electrically insulate active parts. Oil impregnates the kraft paper and improves isolation properties. The active part is covered by kraft paper in form of isolator tape respectively sheets wrapped around the active part, which absorbs oil. The oil is for example transformer oil 10, comprising mineral oil.

Wrapping or taping of active parts with kraft paper sheets is manually done, leading to an expensive and time-consuming production process. Due to complex shapes of active parts like the measuring assembly 11, an automation of taping procedures is difficult and expensive. Handmade taping is fault-prone and needs high accuracy. Faults can lead to short currents and complete failure of the instrument transformer 1, particularly irreversible damage of the instrument transformer 1.

Figure 2:
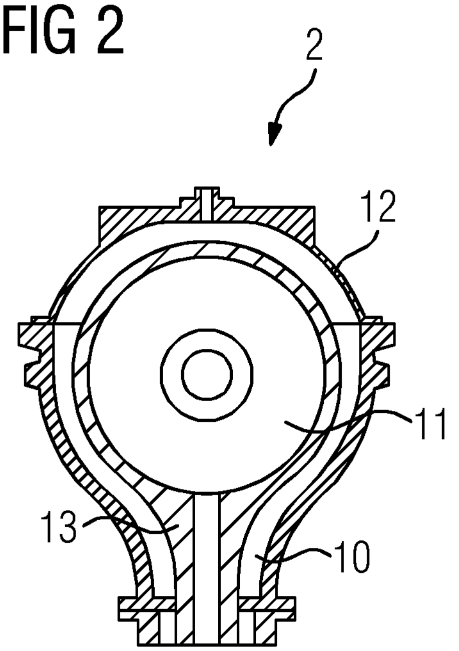
FIG. 2 illustrates in section view the head 2 of instrument transformer 1 of FIG. 1 according to the state of the art.

In FIG. 2 the head 2 of the instrument transformer 1 of FIG. 1 is shown in section view. Kraft paper in form of insulator tape 13 is wrapped around the measuring assembly 11 resulting in an isolator shell around the active part, which is impregnated by oil, particularly transformer oil 10 filled in the housing of the instrument transformer 1. Space between the housing and the active part with kraft paper wrapped, is filled up with oil after assembling. The housing of the instrument transformer 1 is airtight, except an excess pressure outlet. High currents during operation of the instrument transformer produce waste heat, increasing the temperature of oil and leading to high pressure within the instrument transformer 1. Excess pressure and/or oil can dissipate via the excess pressure outlet in an upward direction, to prevent destruction and/or explosion of the instrument transformer 1 and/or injuries of service workforce.

As described above, wrapping active parts of the instrument transformer 1 with isolator tape respectively sheets of kraft paper is time and cost intensive, and fault-prone. In the state of the art wrapping is done handmade, an automation is difficult. Wrapping of active parts before assembling the instrument transformer 1 leads to free space between wrapped parts and the housing, which is filled by oil. Space in between active parts like the measuring assembly 11 and the housing, particularly the head housing 12, cannot be effectively used for isolation by kraft paper, since production tolerances and an assembling of instrument transformer parts lead to free space to be filled by oil.

Figure 3:
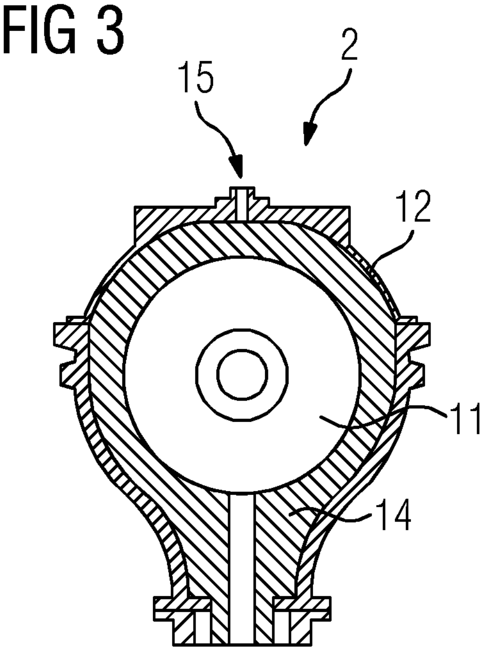
FIG. 3 illustrates in section view the head 2 of an instrument transformer 1 according to the present invention, with particles 14 as insulation material for the active part.

In FIG. 3 the head 2 of an instrument transformer 1 according to the present invention is shown in section view, with particles 14 as insulation material for the active part. The instrument transformer 1 in FIG. 3 is as for FIG. 1 and FIG. 2 described, except the wrapping of active parts with kraft paper in form of isolator tape 13. Instead free space between the housing and active parts is filled by particles 14 of isolation material, particularly particles 14 in powder form. The particle 14 size is for example in the range of micro- and/or nano-meter, and/or the isolation material comprises particles 14 with a size in the range of micro- and/or nano-meter.

The particles 14 are composed of or comprise paper material, and/or cellulose, and/or silicon. These materials show good dielectric properties, particularly good electrical isolation properties. To improve the isolation properties particles are impregnated by a fluid, particularly mineral oil and/or a synthetic oil, and/or ester, particularly vegetable esters. Alternatively, the fluid comprises a gas, for example synthetic air and/or $SF_6$. Particles 14 are for example in spherical form, and/or particles 14 are in fibrous form. The described form allows a high fill factor and a high surface to volume ratio of particles 14, for example at least two times, particularly at least ten times higher than for the same material in form of sheets. A high surface to volume ratio improves impregnation with for example oil and increases with a high fill factor isolation properties.

Particles 14 are filled into the housing for example through a particle filler inlet 15. The filling process can be fully automated, saving time, cost and reducing faults in the isolation of active parts of the instrument transformer 1. An impregnation of particles particularly by oil can be done before filling particles into the housing, producing a solution and/or slurry of particle material like paper material, and/or cellulose, and/or silicon in for example oil. With time a solution and/or slurry can coagulate, consolidate and/or solidify, or stay fluidic. The isolation material made of, respectively comprising particles 14, particularly impregnated by oil, results in a good electrical isolation of active parts towards the housing of the instrument transformer 1.

The above described embodiments of the present invention can be used also in combination and combined with embodiments known from the state of the art. For example, the instrument transformer 1 can be a current transformer, an inductive voltage transformer, a capacitive voltage transformer, a combined current and voltage transformer, a power voltage transformer, and/or an optical current transformer. Active parts can be located in a head housing 2, in an isolator 3 and/or in a base 4. A measuring assembly 11 is for example in the head housing 2 arranged. Alternative instrument transformer designs comprise an isolator 3 and a base 4 without a head housing, for example with measuring assembly 11 arranged in the base 4.

Particles 14 of isolation material comprise paper material, and/or cellulose, and/or silicon or combinations of these materials. Alternative isolator materials in form of particles can be used too, particularly oil solvable materials like plastics and/or porous materials like zeolite, and/or materials like silicon oxide. Particles 14 can be of spherical form, porous and/or fibrous. An impregnation of particles 14 for example with oil can be done before filling the particles 14 into the instrument transformer 1 or after filling the particles 14 into the instrument transformer 1. Particles 14 can be impregnated by an insulating fluid and/or embedded in fluid, particularly in liquid and/or gas, or fully or partly solved in liquid. The insulating fluid can be or can comprise oil, particularly mineral oil and/or a synthetic oil, and/or ester, particularly vegetable esters, or gas, for example clean air and/or $SF_6$.

The isolation material with particles 14 can be arranged in the housing, particularly the head housing 12 and/or isolator 3 and/or base 4. The isolation material can consist of particles 14. Alternatively, the isolation material can consist of and/or comprise particles 14 and paper sheets in combination, particularly kraft paper sheets. The isolation material can be arranged between the housing and active parts, particularly the measuring assembly 11 and the housing, to electrically isolate parts from each other. The isolation material consisting of particles 14 can be arranged in the head housing 12 and/or isolation material consisting of paper sheets can be arranged in the isolator 3. In an alternative arrangement, the isolation material consisting of particles 14 can be arranged in the isolator 3 and/or isolation material consisting of paper sheets can be arranged in the head housing 12. In the isolator 3 all free space can be filled with isolation material or only parts, particularly field electrodes and/or electrical conductors, particularly in tube form, are filled and or wrapped and/or coated with isolation material. In the head housing 12 all free space can be filled with isolation material.

LIST OF REFERENCE CHARACTERS

1 instrument transformer
2 head
3 isolator
4 base
5 terminal box
6 bellow cover
7 oil level indicator
8 high voltage terminals
9 high voltage insulation
10 transformer oil
11 measuring assembly, particularly secondary core/windings
12 head housing
13 isolator tape, kraft paper
14 particles
15 particle filler inlet

The invention claimed is:

1. An instrument transformer for high current and/or high voltage conversion, the instrument transformer comprising:

a housing and at least an active part disposed to form a space between said housing and said at least one active part; and isolation material electrically insulating said active part, said isolation material comprising particles in powder form in a liquid insulation fluid, forming a slurry of particle material within the insulation fluid;

said particles being composed of or including paper material or cellulose, and said insulating fluid being or comprising oil and/or ester; and said slurry of the particle material in said insulation fluid filling said space between said housing and said active parts, and said particles being impregnated by the insulating fluid and embedded in the insulating fluid.

2. The instrument transformer according to claim 1, wherein said oil is selected from the group consisting of mineral oil and synthetic oil, and said ester are vegetable esters.

3. The instrument transformer according to claim 1, wherein a particle size of said particles lies in a micrometer and/or nanometer range.

4. The instrument transformer according to claim 1, wherein said particles are formed of a material, and a surface-to-volume ratio of said particles is at least two times greater than a surface-to-volume ratio of a sheet of said material.

5. The instrument transformer according to claim 4, wherein the surface-to-volume ratio of said particles is at least ten times greater than a surface-to-volume ratio of a sheet of said material.

6. The instrument transformer according to claim 1, wherein said particles are in spherical form and/or said particles are in fibrous form.

7. The instrument transformer according to claim 1, wherein a fill factor of said particles in said isolation material is maximized.

8. The instrument transformer according to claim 1, wherein said isolation material with said particles is arranged in said housing between said housing and at least one active part of the instrument transformer.

9. The instrument transformer according to claim 8, wherein said isolation material with said particles is arranged in at least one of in a head housing, an isolator, a base, and/or between the housing and a measuring assembly.

10. The instrument transformer according to claim 8, wherein said isolation material with said particles is disposed to fill a space between a head housing and/or an isolator and/or a base, and active parts including a measuring assembly.

11. A method for producing an instrument transformer for high current and/or high voltage conversion, the method comprising:

providing a housing and at least an active part disposed to form a space between the housing and the at least one active part;

providing isolation material electrically insulating the active part, the isolation material comprising particles in powder form in a liquid insulation fluid, forming a slurry of particle material within the insulation fluid, the particles being composed of or including paper material or cellulose, and the insulating fluid being or comprising oil and/or ester;

impregnating the particles by the insulating fluid and embedding the particles in the insulating fluid; and filling the space between the housing and the active parts with the slurry of the particle material in the insulation fluid.

12. The method according to claim 11, further comprising impregnating the particles in the housing of the instrument transformer after filling in the particles into the housing.

13. The method according to claim 11, further comprising impregnating the particles to create a pulp, optionally after degassing, and subsequently filling the pulp into the housing of the instrument transformer.

14. The method according to claim 11, wherein the impregnated particles in the housing of the instrument transformer are disposed to electrically insulate active parts of the instrument transformer from the housing of the instrument transformer.

* * * * *